June 1, 1965  E. D. BOUTWELL  3,186,250
ANTIFRICTION SPLIT-NUT DEVICE
Filed Nov. 15, 1961  3 Sheets-Sheet 2

INVENTOR.
ERNEST D. BOUTWELL
BY
ATTORNEYS

June 1, 1965

E. D. BOUTWELL 3,186,250

ANTIFRICTION SPLIT-NUT DEVICE

Filed Nov. 15, 1961

INVENTOR.
ERNEST D. BOUTWELL
BY
ATTORNEYS

United States Patent Office 3,186,250
Patented June 1, 1965

3,186,250
ANTIFRICTION SPLIT-NUT DEVICE
Ernest D. Boutwell, 306 Webber St., Saginaw, Mich.
Filed Nov. 15, 1961, Ser. No. 152,520
3 Claims. (Cl. 74—459)

This invention relates to clutch devices and more particularly to a ball clutch particularly adapted for use in conjunction with feed screws of machines such as lathes, mills, boring mills, and the like, and being operable selectively to be engaged with and disengaged from the threads of the feed screw.

Machines of the kind referred to conventionally make use of split nut portions that are threaded to correspond to the threading of the feed screw and which are adapted to mesh with the feed screw to feed a carriage or tool along the ways of the machine. The meshing of the threads of the nut portions and the feed screw results in a sliding engagement between the threads. Regardless of the materials from which the parts are made, and no matter how carefully the parts are lubricated, use of the machine over a sustained period of time will result in wearing of the threads and consequent inaccurate operation of the machine. Inaccurate machine operation is particularly disadvantageous in those instances where a machine is used for precision work, such as in the cutting of screw threads, for example.

An object of this invention is to provide a clutch device for use with lead screws or the like and wherein the engagement between the meshing parts of the screw and the clutch is rolling, rather than sliding.

Another object of the invention is to provide a ball clutch device having a large number of balls supported thereby so as to provide for a substantial meshing engagement between the clutch and the screw.

A further object of the invention is to provide a clutch device of the character described having a large number of balls supported thereby for circulation so as to minimize wearing of the balls.

Another object of the invention is to provide a clutch of the kind referred to having ball retaining means of improved construction so as to provide for free circulation of the balls.

A further object of the invention is to provide a clutch device having bodily movable ball carriers provided with positive acting means of improved construction for effecting movement of the ball carriers into and out of clutching engagement.

Other objects and advantages of the invention will be pointed out specifically or will become apparent from the description when it is considered in conjunction with the appended claims and the accompanying drawings, in which:

Figure 1:
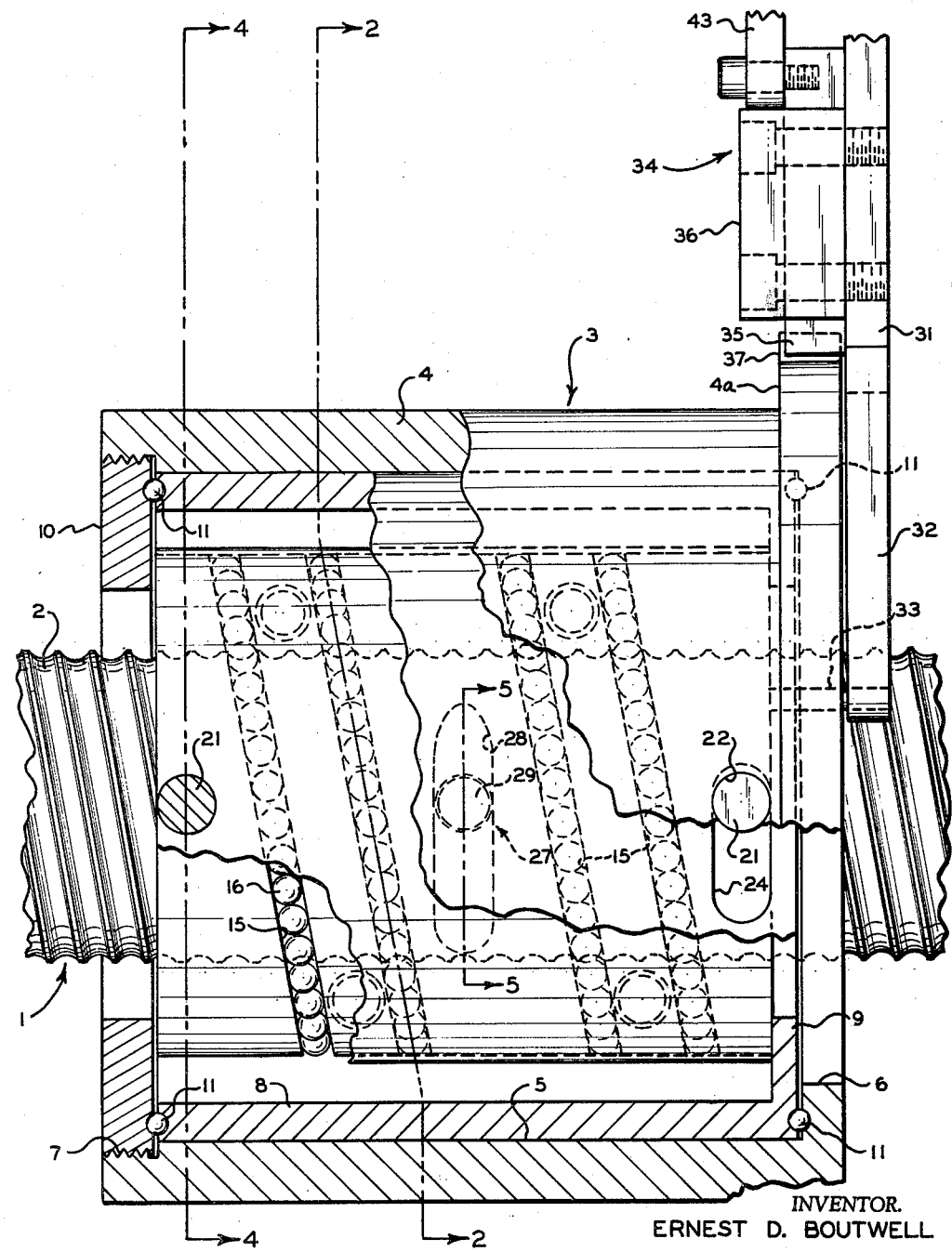
FIGURE 1 is a fragmentary, side elevational view of a threaded feed shaft equipped with a clutch device constructed in accordance with the invention, certain parts of the clutch being broken away for purposes of illustration.

Apparatus constructed in accordance with the invention is adapted for use in conjunction with a conventional feed shaft or screw 1 having helically arranged threads 2 formed therein a conventional manner. The threads may be generally U-shaped in section, as shown, or they may be V-shaped. The shaft 1 may constitute the feed screw of a lathe, boring mill, or other machine, and it may be provided with either power or manual means for rotating it.

The clutch device is designated generally by the reference character 3 and comprises an annular housing sleeve or shell 4 provided with any one of a number of suitable means such as a peripheral flange 4a and bolts 4b for attaching it to a carriage or other device that is to be shifted back and forth upon rotation of the shaft 1. The housing 4 has a smooth, internal bore 5 terminating at one end in a radially inwardly projecting flange 6, the other end of the housing being interiorly threaded as at 7. The housing 4 receives an oscillatable operating sleeve 8 having a radially inwardly directed flange 9 at the end adjacent the housing flange 6. The sleeve 8 is removably and rotatably retained within the housing 4 by means of a threaded retaining ring 10 that is removably threaded into the housing 4. Preferably, anti-friction means such as ball bearings 11 mount the sleeve 8 in the housing for free rotation relative thereto.

The sleeve 8 is hollow and is provided with a smooth internal bore 12. Within the sleeve 8 is received a plurality, e.g., a pair, of arcuate carrier members 13 arranged end to end to form an opening therebetween for reception of the threaded shaft 1. Each of the carrier members 13 is identical and comprises a generally kidney shaped body 14 having a length corresponding substantially to the length of the sleeve 8 and having a curvature corresponding to the curvature of the shaft. Encircling each body member is a plurality of grooves 15. The grooves are spaced from one another longitudinally of the body member and are inclined at such pitch as to correspond to the pitch of the threads 2. In each groove 15 is a plurality of freely rotatable balls 16 of uniform diameter. The depth of the grooves at the convex side of the body member corresponds to the diameter of the balls, whereas the depth of the groove at the concave side of the body is less than the diameter of the balls to enable the latter to project beyond the carrier. Each groove is covered by a retaining plate 17 which may be screwed, welded, or otherwise suitably secured to the body member 14. The cover plate 17, together with the base and sides of the slots 15, forms passages through which the balls may circulate freely.

Figure 3:
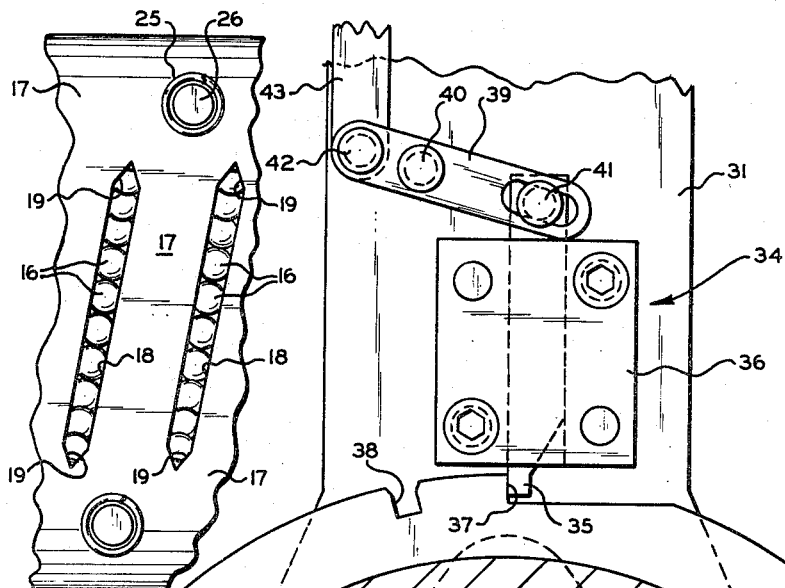
FIGURE 3 is a fragmentary sectional view taken on the line 3—3 of FIGURE 2.

The retaining plate 17 is slotted as at 18 (see FIGURE 3) along the inner concave surface of each carrier member, the width of the slots 18 being somewhat less than the diameter of the balls 16, thereby permitting the latter to extend partially through the slots, but preventing the balls from falling through the slots. Preferably, the sides of the slots converge toward one another at the ends 19 of the slots, and the adjacent portions of the body member are gently curved as at 20 to permit the balls to pass from and to the covered portions of the passages without any abrupt changes of direction. The construction and arrangement of the parts of the carrier members thus far described are such that the balls project beyond the inner surface of each carrier member a distance sufficient to permit each ball to seat in a thread 2 of the shaft 1.

Each of the carrier members 13 is mounted for bodily movements toward and away from the screw 1 so as to enable the projecting balls selectively to engage and disengage the screw threads 2. The mounting means for each carrier member is identical and comprises two or more pins or posts 21 having corresponding ends force fitted in openings 22 formed in the housing 4, the other ends of the pins being slideably received in openings 23 formed in the carrier members 13. Each pin 21 passes freely through an elongated slot 24 formed in the sleeve 8 for a purpose presently to be explained. By fixing each pin 21 in the housing 4, neither carrier member 13 is capable of rotating relative to the housing. However, since the pins are slideable in the carrier members, the latter are capable of bodily relative movement towards and away from the shaft 1.

Means is provided for effecting movements of the carrier members towards and away from the shaft and comprises compression springs 25 interposed and reacting between the adjacent ends of the carrier members 13. Guide posts 26 may be welded or otherwise suitably fixed to the ends of the members 13 for reception in the opposite ends of the springs 25. The springs 25 normally exert a yieldable force on the carrier members 13 tending to urge them away from one another so as to disengage the balls 16 from the screw threads 2.

The force of the springs is adapted to be overcome and controlled by cam means designated generally by the reference character 27 and comprising a pair of circumferentially spaced, parabola shaped cam slots or grooves 28 formed in the inner wall of the sleeve 8, each of the cam grooves receiving a plug type, blunt nose cam follower 29 that is fixed in an opening 30 formed in the adjacent carrier member 13. As has been pointed out earlier, the sleeve 8 is rockable in the housing 4 and oscillation of the sleeve may be effected by means of a manipulatable handle 31 having a pair of diverging legs 32 which are pinned as at 33 to the flange 9 of the sleeve 8. The construction is such that rocking of the handle 31 causes corresponding rocking of the sleeve 8, limited rotation of the sleeve within the housing being permitted because of the slots 24 through which the pins 21 extend.

Figure 2:
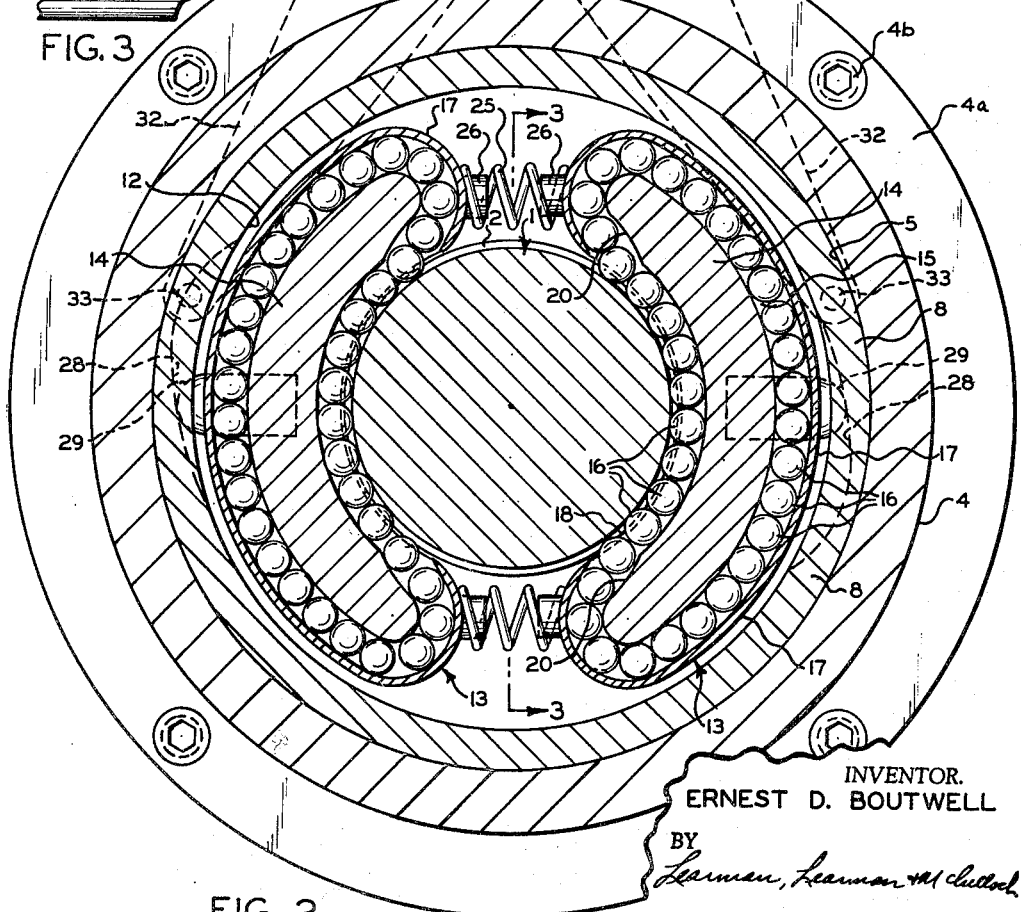
FIGURE 2 is a vertical sectional view taken on the line 2—2 of FIGURE 1, and illustrating the clutch in engaged condition.

When the parts of the apparatus are assembled in the manner disclosed in the drawings, and with the handle 31 in the position shown in FIGURE 2, the cam surfaces 28 of the sleeve 8 will be in such position relative to the cam followers 29 that the carrier members 13 will be forcibly held in a position such that the projecting balls 16 seat in the screw thread 2 of the shaft 1. In these positions of the parts, rotation of the screw 1 will cause the clutch device 3 to traverse the screw shaft.

Figures 4, 5:
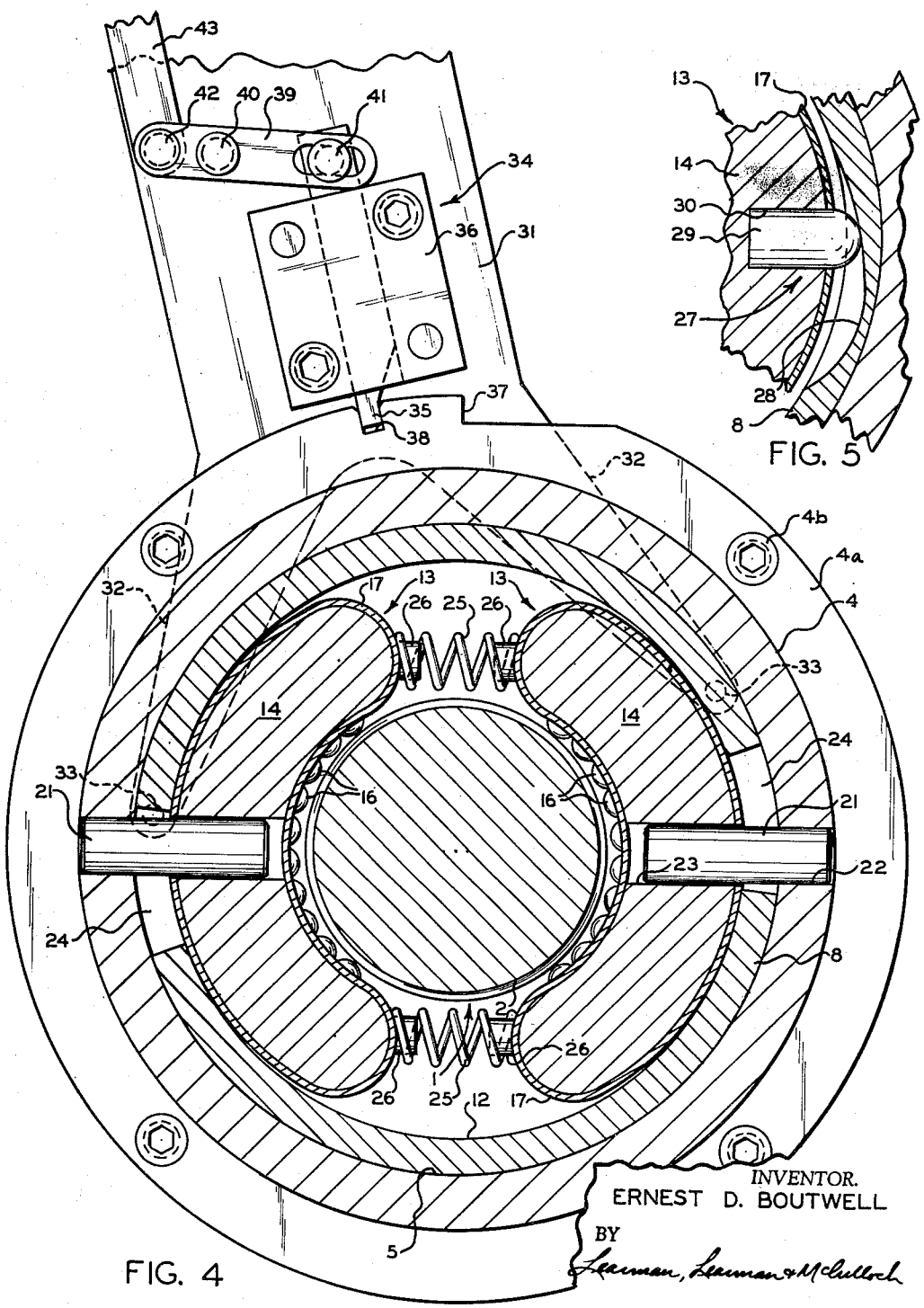
FIGURE 4 is a view similar to FIGURE 2, but taken on the line 4—4 of FIGURE 1 and illustrating the clutch and its disengaged condition.
FIGURE 5 is a fragmentary, sectional view taken on the line 5—5 of FIGURE 1.

When it is desired to disengage the clutch from the shaft 1, the handle 31 may be rocked counterclockwise from the position shown in FIGURE 2 to the position shown in FIGURE 4. Rocking of the handle will cause corresponding rocking of the sleeve 8, as permitted by the elongated slots 24, whereupon the forces exerted on the cam followers 29 by the cam surfaces 28 will be relaxed. Relaxation of the forces exerted on the cam followers will enable the springs 25 to expand and move the carrier members 13 away from one another so as to withdraw the balls 16 from the threads 2 of the shaft 1, thereby disengaging the clutch.

Relative rotation between the carrier member 13 and the shaft 1 will cause each of the balls 16 in engagement with the shaft to rotate and roll, rather than slide, upon the shaft 1. Rolling of the balls in engagement with the shaft will cause them to travel through the passages formed in the carrier members or, stated differently, to circulate so as to provide a minimum of friction between themselves and the screw shaft, thereby greatly minimizing wear of the threads of screw shaft.

The apparatus preferably includes means for latching the clutch in engaged and disengaged positions. The latching means may comprise a bolt 35 reciprocably mounted in a slide 36 which may be bolted or otherwise fixed to the handle 31, the bolt 35 being selectively engageable with a stop 37 formed in the housing flange 4a and adapted to maintain the clutch device in engaged condition. Alternatively, the bolt 35 may be received in a notch 38 formed in the flange 4a in which position the clutch is latched in disengaged condition. Operating means for the bolt may comprise a link 39 pivoted to the handle as at 40. One end of the link is slotted for reception of a pin 41 on the bolt 35. The other end of the link 39 is pivoted by a pin 42 to an operating lever 43 which may be manipulated by the machine operator.

The disclosed embodiment is representative of a presently preferred form of the invention, but is intended to be illustrative rather than definitive thereof. The invention is defined in the claims.

What I claim is:

1. An antifriction split-nut device adapted to traverse a helically threaded shaft, said device comprising an annular sleeve; a pair of arcuate carrier members arranged in end-to-end relation to form an opening adapted to receive said shaft; a plurality of freely rotatable balls supported by said carrier members and projecting therefrom for engagement with the threads of said shaft; means mounting said carrier members in said sleeve for movement radially of said sleeve in either of two directions to decrease or increase the size of said opening for respectively engaging and disengaging said balls with and from the threads of said shaft; oscillatable operating means mounted in said sleeve between the latter and said carrier members; interengageable cam means on said carrier members and said operating means operable in response to oscillation of the latter to move said carrier members in at least one of said directions; manipulatable means connected to said operating means for oscillating the latter; and means reacting between said mounting means and said operating means for limiting oscillating movement of the latter.

2. The apparatus set forth in claim 1 including spring means interposed between said carrier members and constantly acting on the latter to urge said carrier members in a direction to increase the size of said opening.

3. The apparatus set forth in claim 2 including releasable latch means on said sleeve and said manipulatable means for latching the latter in such position that said balls engage the threads in said shaft.

References Cited by the Examiner

UNITED STATES PATENTS

| 879,862 | 2/08 | Fuchs | 192—71 |
|---|---|---|---|
| 1,535,135 | 4/25 | Rodel | 74—459 |
| 1,678,731 | 7/28 | Klauset. | |
| 1,750,140 | 3/30 | Thompson. | |
| 2,138,784 | 11/38 | Cooley et al. | |
| 2,321,442 | 6/43 | Wilson. | |
| 2,393,764 | 1/46 | Frank. | |
| 2,491,543 | 12/49 | Alfonso. | |
| 2,503,009 | 4/50 | Thomson. | |
| 2,673,473 | 3/54 | Phelps | 74—458 |

FOREIGN PATENTS

| 562,932 | 7/44 | Great Britain. |
|---|---|---|

DON A. WAITE, *Primary Examiner.*

BROUGHTON G. DURHAM, *Examiner.*